No. 810,779. PATENTED JAN. 23, 1906.
A. C. LINDGREN.
WHEELED PLOW.
APPLICATION FILED JULY 25, 1905.

5 SHEETS—SHEET 1.

Witnesses

Inventor
A. C. Lindgren
By P. T. Dodge
Attorney

No. 810,779. PATENTED JAN. 23, 1906.
A. C. LINDGREN.
WHEELED PLOW.
APPLICATION FILED JULY 25, 1905.
5 SHEETS—SHEET 3.

No. 810,779. PATENTED JAN. 23, 1906.
A. C. LINDGREN.
WHEELED PLOW.
APPLICATION FILED JULY 25, 1905.

5 SHEETS—SHEET 5.

Witnesses
Raymond F. Barnes.

Inventor
A. C. Lindgren
P. T. Dodge
Attorney

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

WHEELED PLOW.

No. 810,779.     Specification of Letters Patent.     Patented Jan. 23, 1906.

Application filed July 25, 1905. Serial No. 271,209.

*To all whom it may concern:*

Be it known that I, ALEXUS C. LINDGREN, of Moline, county of Rock Island, and State of Illinois, have invented a new and useful Improvement in Wheeled Plows, of which the following is a specification.

This invention has reference to wheeled plows embodying a wheeled carrying-frame and a plow beam or beams sustained thereby and movable vertically with relation thereto.

The invention consists, mainly, of improved mechanism for elevating and depressing the plow-beam, which mechanism is designed to be operated by the feet of the driver.

The invention consists also of improved means for adjusting the inclination or "set" of the rear furrow-wheel.

The invention consists, further, in improved means for insuring the proper active position of the plow and supporting the same when it is lowered for plowing.

The invention consists, finally, of various improvements in the detailed construction of the machine, which will be fully described in the specification and their novel features pointed out in the claims.

Figure 1:
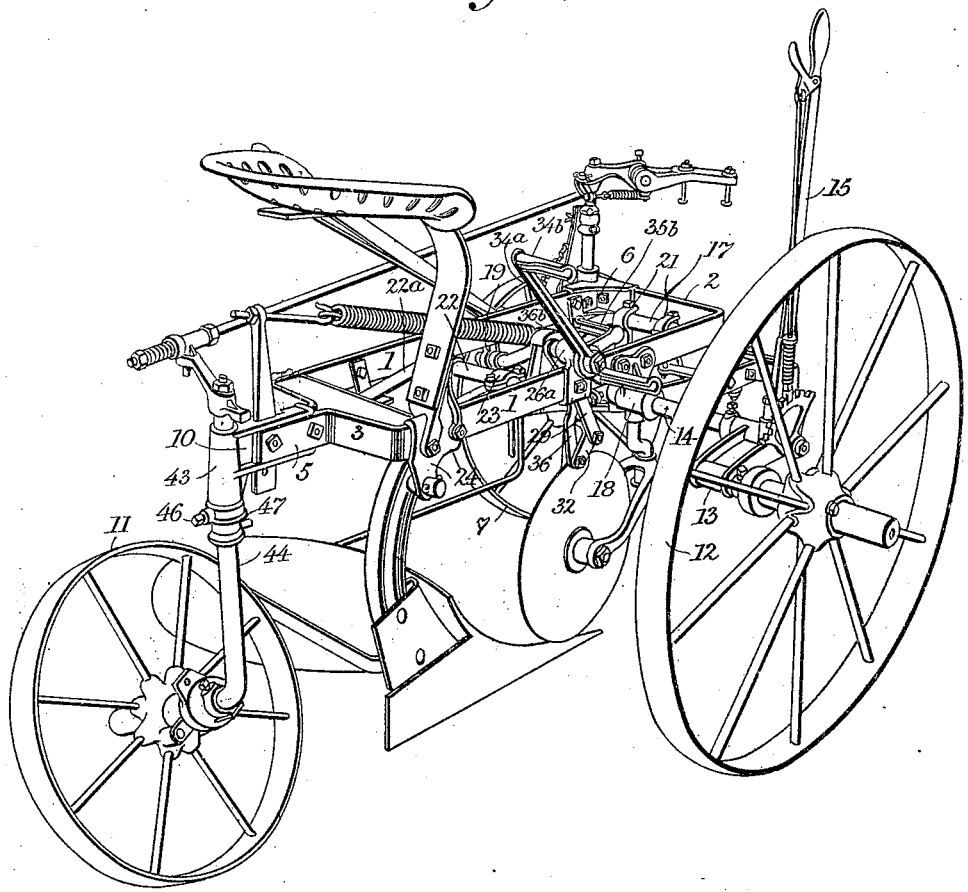
Figure 2:
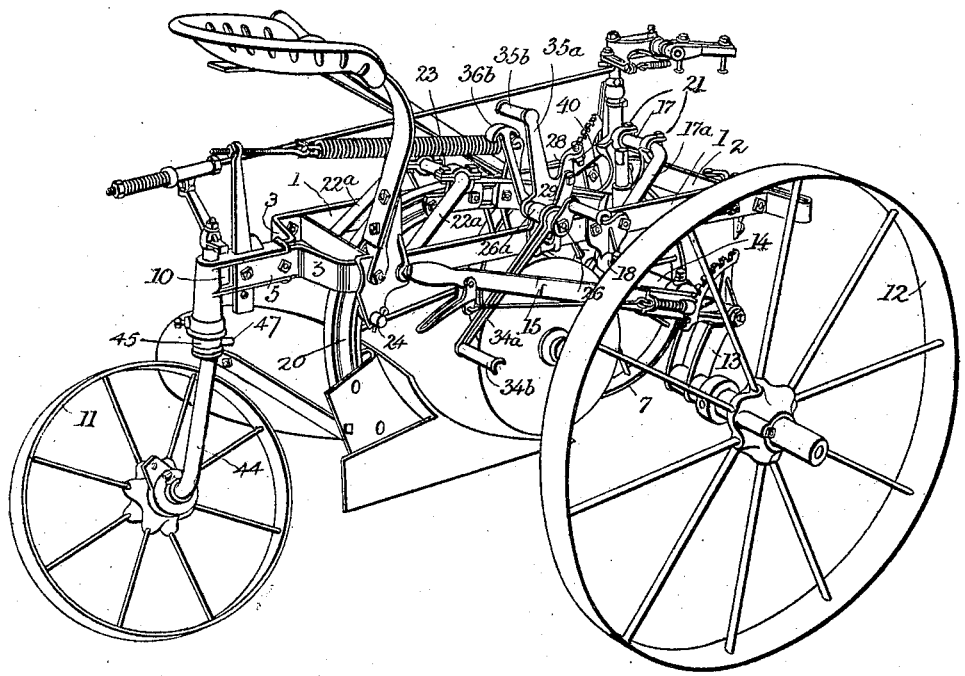
Figure 3:
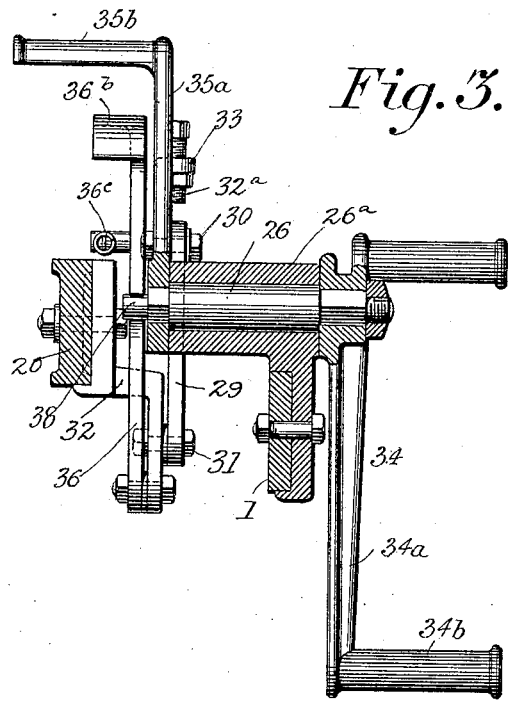
Figure 4:
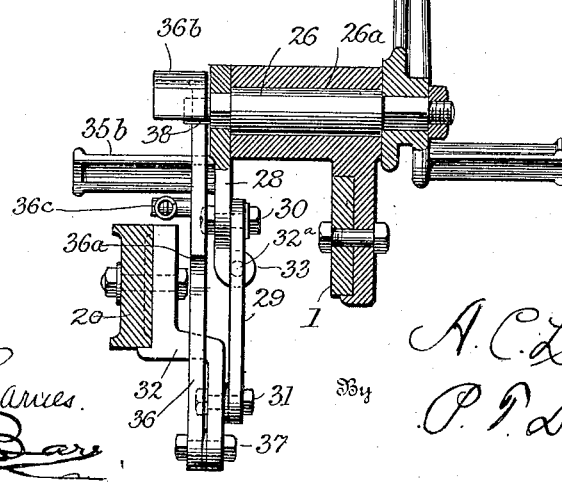
Figure 5:
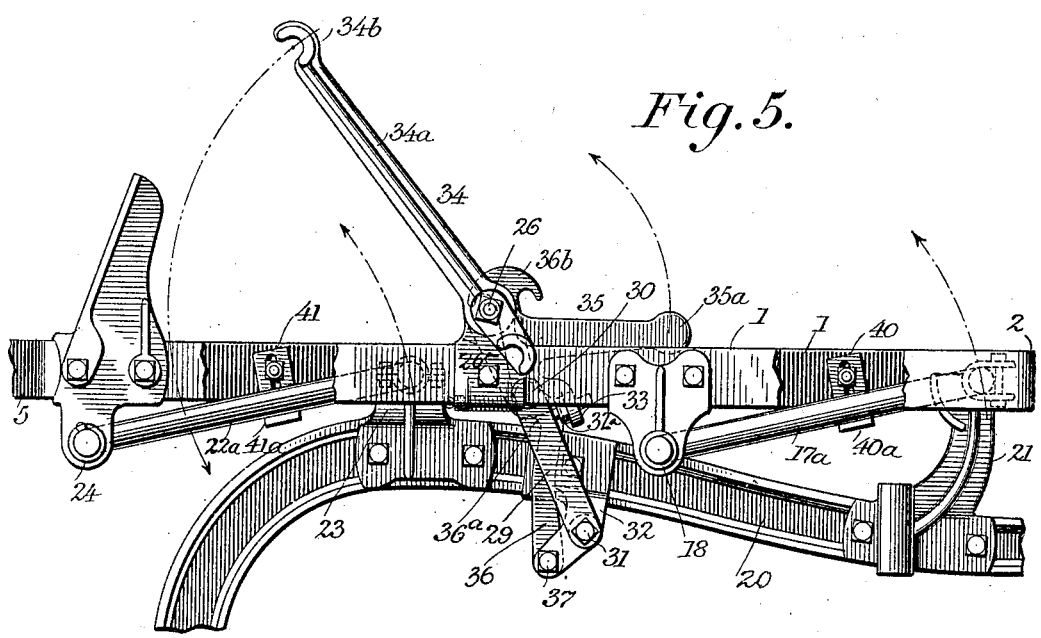
Figure 6:
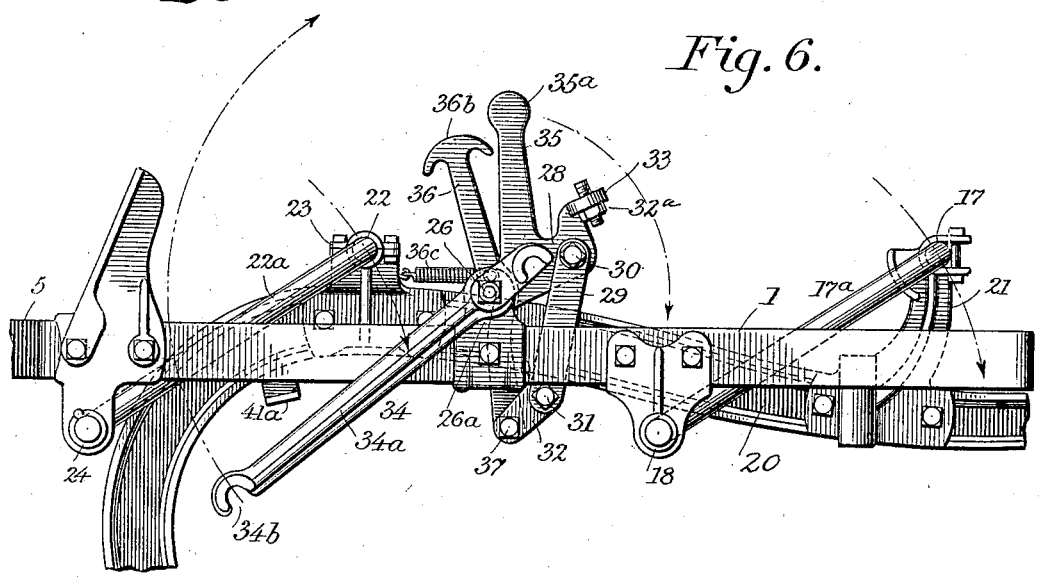
Figure 7:
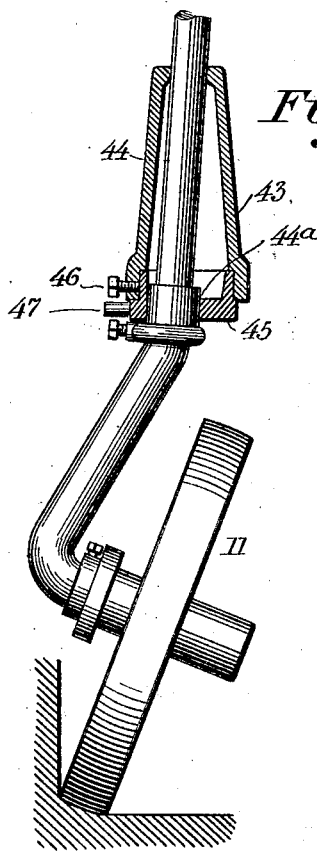
Figure 8:
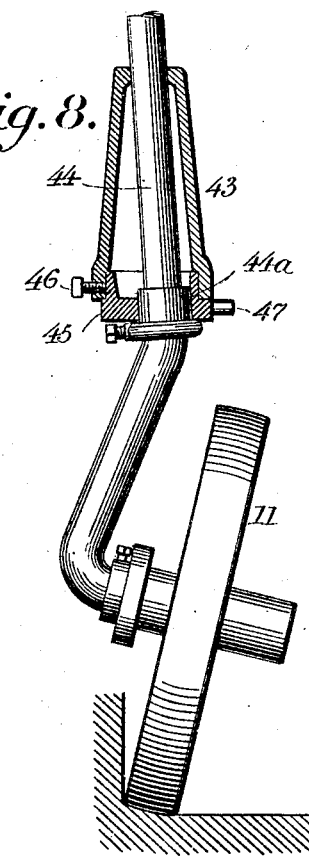
Figure 9:
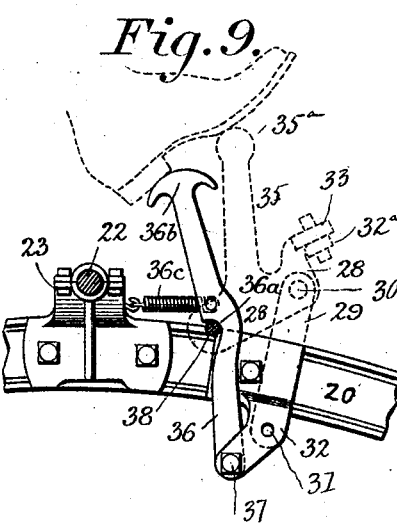

In the accompanying drawings, Figure 1 is a perspective view of my improved machine looking from the landside with the plow-beam in its depressed position for action. Fig. 2 is a similar view with the beam elevated out of action. Fig. 3 is a vertical transverse sectional elevation of the mechanism for elevating and depressing the beam, showing the beam raised. Fig. 4 is a similar view with the beam lowered. Fig. 5 is a side elevation of a portion of the frame and the elevating mechanism, showing the beam lowered. Fig. 6 is a similar view with the beam raised. Fig. 7 is a vertical transverse sectional elevation through the rear furrow-wheel support, showing the means for adjusting the inclination or set of the said wheel. Fig. 8 is a similar view showing the wheel adjusted so as to stand more nearly in a vertical position. Fig. 9 is an elevation, partly in section, of the latch-rod and adjacent coöperating parts for holding the beam elevated.

Referring to the drawings, referring particularly to Figs. 1 to 6 and to Fig. 9, the frame of the machine is rectangular in form and consists of two parallel fore-and-aft frame-bars 1, a front transverse connecting frame-bar 2, and rear transverse connecting frame-bars 3. In its specific form this frame is made up of two sections or members, one section—that on the landside—comprising a single metallic bar with its front portion bent laterally and extending furrowward and constituting the front transverse frame-bar 2, and its rear portion bent first laterally and then extending longitudinally rearward, as at 5. The other section of the frame consists of a single metallic bar having its front end connected to the end of the front frame-bar 2 by means of an angular casting 6, to which casting the ends of said bars are firmly bolted and which casting is suitably constructed, as will be fully described hereinafter, to give support to the front furrow-wheel 7. At its rear end this section of the frame is bent laterally landward and is then extended longitudinally rearward, as at 9, parallel with the extension 5 of the other frame-section, and between these two longitudinal extensions 5 and 9 a casting or block 10 is firmly bolted and is suitably constructed, as will be more fully described hereinafter, to give support to the rear furrow-wheel 11. On the landside the frame is sustained by a land-wheel 12, carried on the end of a crank-arm 13, mounted loosely on the horizontal projecting end of a bar 14. The crank-arm is adapted to be locked to this bar in different positions around its axis, so as to adjust the land-wheel, by means of a hand-lever 15, fixed at its inner end to the crank-arm and provided with a locking-dog engaging a toothed segment fixedly connected with the end of the bar 14. The bar 14 is formed as a continuation of a front guiding-bail 17, with the usual side arms 17ª, journaled at their ends in the said frame-bars 1 in suitable bearings 18, fixed to said frame-bars. The bail is jointed at its middle portion to the forward part of the plow-beam 20 through the medium of a vertical bracket 21, fixed to the beam. In rear of this bail the beam is carried by a second bail 22, provided with the usual side arms 22ª, mounted at their ends in bearings 24, fixed to the frame-bars 1, which bail has its middle portion journaled in a bearing 23, fixed to the beam. These guiding-bails serve, as usual in constructions of this type, to sustain the beam in a "level" position and guide the same in this position in its movements up and down, the arrangement being such that when the beam is raised it will move rearward and when it is lowered it will move forward, the upward movement causing the land-wheel to move downward and in this way maintaining the level of the frame.

The elevation and depression of the beam is effected by the improved mechanism now to be described, which constitutes the main part of my invention. This mechanism is shown particularly in Figs. 1, 2, 3, and 4, and comprises a short horizontal rock-shaft 26, mounted in a bearing-box $26^a$, fixed to the landside frame-bar 1 about midway of the length of said bar. At its inner end the rock-shaft has fixed to it a crank-arm 28, constituting one link of a "toggle," the other link 29 being jointed to the crank-arm 28, as at 30, and having its opposite end jointed, as at 31, to a bracket-plate 32, fixed to the plow-beam, the arrangement being such that when the shaft is rocked backward the toggle will be broken, as shown in Fig. 2, and the beam will be elevated, and when the shaft is rocked forward the toggle-links will be extended, as shown in Figs. 1 and 5, and the beam will be lowered, the degree of extension of the links being controlled and determined by an adjustable stop $32^a$ in the form of a screw extending through the end of an arm 33, forming an extension of the crank-arm 28, and adapted when the links are extended to come in contact with the upper edge of link 29. By the proper adjustment of this stop-screw the links may be caused when extended to lock the beam down in action, or the beam may be prevented from being locked, so as to be capable of rising immediately in the event of encountering obstructions. The rocking of the shaft 26 to elevate and depress the beam is effected, respectively, by two foot-levers 34 and 35, the former being fixed to the outer end of the rock-shaft, and the latter being fixed to the crank-arm 28. The foot-lever 34 is in the form of a long arm $34^a$, fixed at its inner end to the squared end of the rock-shaft and provided at its free end with a lateral foot-rest $34^b$. This foot-rest extends when the beam is down and in action, as shown in Figs. 1 and 5, in such position that the driver may place his foot thereon and press downward, with the result that the shaft will be rocked rearward and the beam will be elevated. The other foot-lever 35 for depressing the beam is in the form of an arm $35^a$, extending upward from the crank-arm 28, its free end being provided with a laterally-extending foot-rest $35^b$, which when the beam is in raised position is so disposed that the driver may press downward thereon with his foot, thereby straightening out the toggle-links and depressing the beam. In order that when in raised position the beam may be locked, so as to be conveniently released when it is to be again lowered, I provide a locking device in the form of a latch-rod 36, pivoted at its lower end, as at 37, to the bracket-plate 32 on the beam, and provided in its rear edge with a locking-notch $36^a$, adapted when the beam is elevated to its full height to engage over a locking-lug 38 on the frame of the machine, in the present instance the inner projecting end of the rock-shaft 26, and in this manner hold the beam elevated. The upper end of the latch-rod is provided with a foot-rest $36^b$, which when the beam is raised and locked by the latch will extend just below and slightly in rear of the foot-rest of the depressing-lever, as shown in Figs 6 and 9, so that the driver by resting his toe on the foot-rest of the depressing-lever may with his heel press forward on the latch-rod and disengage its locking-notch from the locking-pin, whereupon by pressing with his toe on the depressing-lever he may lower the beam. The locking-latch is acted on by a tension-spring $36^c$, having one end connected with the latch and its opposite end connected with the beam and acting to hold the latch against the locking-pin as the beam is moved up and down and causing the notch in the latch-rod to engage automatically over the locking-pin when on the elevation of the beam the notch arrives opposite the pin.

It will be observed that the locking-latch is entirely independent in its action of the action of the depressing-lever, is entirely disengaged from this lever and performs no function in effecting either the depression or elevation of the beam. Its foot-rest, however, is so arranged relatively to the depressing-lever that the driver by one foot is enabled to both unlock the beam and effect its depression. It will be further observed that the latch-rod being connected at its lower end with the beam will be carried downward when the beam is depressed, so that when the plow is in action the upper end of the latch will be down out of the way, as shown in Figs. 1 and 5.

In the drawings I have illustrated my invention as applied to a single plow-beam, carrying a single moldboard-plow. It is obvious, however, that the invention is applicable to gang-plows without in any manner changing the construction or action of the mechanism, for instead of the single beam two or more connected beams, with their corresponding moldboards, may be employed, the invention residing not in the form or arrangement of the beams, but in the mechanism for elevating and depressing the same.

In order that when two guiding-bails are swung forward and downward to lower the beam they will be given firm and even support by the frame when in their lowered position and be limited in their movement downward, I provide the frame of the machine with stops 40 and 41, situated, respectively, at the front and rear in position to be encountered by the two bails when the beam is lowered and in action. The stop device 40 at the front of the frame is in the form of a bracket fixed to the inner side of the furrow-frame bar 1 and provided with an inwardly-extending horizontal supporting projection 40ª in position to be encountered by the side arm 17ª of the forward bail when the latter is lowered and serving as a stop or rest for the bail. The rear stop 41 is of similar form with its projecting horizontal support 41ª in position to be encountered by the side arm 22ª of the rear bail when it is swung downward to lower the beam. It will be observed that these stops constitute, in effect, supporting points or rests for the two bails, and in this manner prevent them from sagging at one side or twisting, so that the beam will be held steady and in its proper position with the moldboard in its most favorable position for effective action and at the proper depth in the ground.

It is frequently desirable to vary the inclination of the rear furrow-wheel, so that it may under the changing conditions encountered in practice be held close up in the corner of the furrow in order to relieve the plow of landside friction and in order to properly resist the tendency of the plow to crowd landward. I propose to effect this object by adjusting the wheel in the manner illustrated in Figs. 1, 7, and 8, where it will be seen that there is fixed to the rear end of the casting 10 a vertical depending tubular conical shell 43, open at its two ends with its larger end down. The vertical furrow-wheel stem 44 extends upward through an opening 44ª, arranged eccentrically in an adjusting-disk 45, adapted to be oscillated in the enlarged lower end of the shell and confined in its adjusted position by a horizontal set-screw 46, screwed through the wall of the shell with its inner end in position to bind on the periphery of the adjusting-disk. The stem 44 extends upward through and beyond the upper end of the shell, so that it is capable of a rocking motion within the same, which motion is controlled and effected by the oscillating or turning movement of the adjusting-disk. The disk is provided with a laterally-projecting handle 47, by means of which it may be turned to adjust the wheel, the set-screw 46 being first loosened, and after the adjustment of the wheel is effected is again tightened up on the disk. With the furrow-wheel set as shown in Fig. 7 its tendency will be to force the heel of the plow away from the land and in this manner relieve the landside of friction.

Having thus described my invention, what I claim is—

1. In a plow, the combination of the frame, a plow-beam supported thereby and movable vertically with relation thereto, a beam-depressing foot-lever mounted on the frame, operative connections between the foot-lever and the beam for depressing the beam, and a locking device carried by the beam and adapted when the beam is elevated to engage the frame and hold the beam raised, said locking device adapted to be unlatched by means independent of the foot-lever, and being extended in proximity to said foot-lever; whereby the driver may with one foot both release and lower the beam.

2. In a plow, the combination with the frame, of a plow-beam supported thereby and movable vertically with relation thereto, a beam-depressing lever mounted on the frame and operatively connected with the beam for depressing the same, said lever being extended within reach of the driver, and a locking-latch mounted on the beam and adapted, when the beam is elevated, to interlock with the frame and hold the beam raised, said locking-latch being extended within reach of the driver and in proximity to the depressing-lever, and adapted to be unlatched by means independent of the depressing-lever; whereby the driver is enabled to conveniently release the beam and effect its depression.

3. In a plow, the combination with the frame, of a plow-beam supported thereby and movable vertically with relation thereto, a beam-depressing foot-lever mounted on the frame, operative connections between the lever and the beam for depressing the latter, a foot-rest on the lever, a locking-latch connected with the beam and formed to interlock with the frame when the beam is elevated and hold the same raised; said locking-latch being independent in its action of the beam-depressing lever and a foot-rest on said latch extending in proximity to the foot-rest of the depressing-lever.

4. In a plow, the combination with the frame, of a plow-beam supported thereby and movable vertically, a foot-lever mounted on the frame, operative connections between the foot-lever and the beam for depressing the latter, a foot-rest on the lever, a locking-latch connected with the beam and formed, when the beam is elevated, to interlock with the frame and hold the beam raised, and a foot-rest on the locking-latch disposed adjacent to the other foot-rest and a short distance below the same; whereby the driver may with one foot resting on the foot-rest of the depressing-lever first release the latch with the heel and then depress the beam.

5. In a plow, the combination with the frame, of a vertically-movable plow-beam supported thereby, a foot-lever mounted on the frame and extending upwardly when the beam is raised, operative connections between the lever and the beam, adapted, when the lever is forced forward, to depress the beam, and a latch-rod jointed to the beam and arranged, when the beam is elevated, to extend upward alongside the foot-lever and to interlock with the frame, and adapted to be unlatched by means independent of the foot-lever.

6. In a plow, the combination with the frame, of the vertically-movable plow-beam supported thereby, a transverse rock-shaft mounted on the frame, a crank-arm on one end of the shaft, a link connecting the crank-arm with the beam, a foot-lever connected with the crank-arm and formed with a foot-rest, a second foot-lever on the opposite end of the rock-shaft, a latch-rod pivoted to the beam and formed when the beam is elevated to interlock with the frame and hold the beam raised, and a foot-rest on the latch-rod in position to extend in proximity to the foot-rest of the depressing-lever when the beam is locked in elevated position.

7. In a wheeled plow, the combination with the frame, of a vertically-movable plow-beam sustained thereby, means for elevating the beam, a locking device for holding the beam in elevated position, and mechanism for depressing the beam when released, the said locking device and the said depressing mechanism being wholly independent of each other, and both adapted to be actuated by one foot.

8. In a plow, the combination with the frame, of a vertical shell or bearing connected thereto, a horizontal oscillating disk mounted in the same and formed with an opening eccentrically disposed, a vertical furrow-wheel stem extending through the opening in the disk and into the shell, means for oscillating the disk to effect the adjustment of the stem, and means for fastening the disk fixedly to said shell in its different adjusted position.

9. In a plow, the combination with the frame, of a vertical hollow conical shell fixed thereto, a horizontal adjustable disk mounted for oscillation in the larger end of the shell, and formed with an opening eccentrically disposed, a furrow-wheel stem extending through the opening in the disk and through the end of the shell, means for oscillating the disk to effect the adjustment of the stem, and means for holding the disk in its adjusted position.

10. In a plow, the combination with the frame, of a support for the rear furrow-wheel stem, said support comprising a vertical hollow conical shell fixed to the frame with its smaller end uppermost, a horizontal adjusting-disk provided with an eccentrically-disposed opening mounted loosely in the base of the shell, a vertical furrow-wheel stem extending through the opening in the disk and into the shell, a handle on the disk, and a binding-screw carried by the shell and adapted to engage the disk.

In testimony whereof I hereunto set my hand, this 24th day of May, 1905, in the presence of two attesting witnesses.

ALEXUS C. LINDGREN.

Witnesses:
C. H. LIPPINCOTT,
L. C. BLANDING.